United States Patent [19]

Hampton

[11] Patent Number: 5,219,667
[45] Date of Patent: Jun. 15, 1993

[54] HONEYCOMB STRUCTURE AND METHOD OF FORMING

[75] Inventor: Leslie E. Hampton, Corning, N.Y.
[73] Assignee: Corning Incorporated, Corning, N.Y.
[21] Appl. No.: 805,886
[22] Filed: Dec. 12, 1991
[51] Int. Cl.[5] .......................... B01J 35/04; F01N 3/24
[52] U.S. Cl. ................................... 428/593; 428/599; 502/527; 502/439; 29/890
[58] Field of Search ........................ 428/117, 593, 599; 29/423, 424, 890; 409/131; 422/180; 502/439, 527

[56] References Cited

U.S. PATENT DOCUMENTS

| | | | |
|---|---|---|---|
| 1,280,892 | 10/1918 | Steenstrup | 29/424 |
| 1,332,445 | 3/1920 | Mershon | 29/424 |
| 2,446,672 | 8/1948 | Sirp | 29/424 |
| 2,884,091 | 4/1959 | Baldwin | 183/71 |
| 2,952,333 | 9/1960 | Bush | 183/71 |
| 3,093,370 | 6/1963 | May et al. | 29/424 |
| 3,176,387 | 4/1965 | Argueso | 29/423 |
| 3,242,649 | 3/1966 | Rivers | 55/132 |
| 3,276,784 | 10/1966 | Anderson | 428/117 |
| 3,413,708 | 12/1968 | Norville et al. | 428/117 |
| 3,790,654 | 2/1974 | Bagley | 264/177 |
| 3,801,289 | 4/1974 | Wiley | 422/180 |
| 3,902,551 | 9/1975 | Lundsuger et al. | 428/117 |
| 4,340,403 | 7/1982 | Higuchi et al. | 428/117 |
| 4,363,644 | 12/1982 | Sato et al. | 428/117 |
| 4,396,664 | 8/1983 | Mochida et al. | 422/180 |
| 4,758,272 | 7/1988 | Pierotti | 75/246 |

FOREIGN PATENT DOCUMENTS 2261663  6/1974  Fed. Rep. of Germany ........ 29/890

Primary Examiner—John Zimmerman
Attorney, Agent, or Firm—Burton R. Turner

[57] ABSTRACT

A novel method is disclosed for producing honeycomb structures with a virtually non-abrasive smoothly rounded edge between opposed end surfaces of the honeycomb structure and a peripheral bounding wall, so as to avoid detrimental cutting and abrading of surrounding supporting and insulating material utilized in vehicular applications.

20 Claims, 1 Drawing Sheet

HONEYCOMB STRUCTURE AND METHOD OF FORMING

BACKGROUND OF THE INVENTION

This invention relates to the art of producing thin-walled honeycomb structures, such as those that would have utility as a substrate in emissions control from an internal combustion engine. Such substrates may be formed from extrudable material such as particulate ceramic and/or metal batches and similar materials which have the property of being able to flow or plastically deform during extrusion, while being able to become sufficiently rigid immediately thereafter so as to maintain their structural integrity, in the manner set forth in U.S. Pat. Nos. 3,790,654 and 4,758,272. Alternatively, the honeycomb structure may be made of pleated thin porous sheets of filter material whose layers are interleaved with corrugated or crimped spacers with the parallel corrugations or crimps thereof extending substantially perpendicular to the folds of the pleated sheets, as disclosed in U.S. Pat. Nos. 2,884,091, 2,952,333 and 3,242,649.

The invention particularly relates to the problem of abrasive edges surrounding the opposed faces at the longitudinal ends of metal honeycomb structures. That is, the opposed edges of such metal honeycomb structures each function as an unwanted cutting edge, and are a source of abrasion to insulating material which is utilized to surround the substrate and support it within and insulate it from an enclosing canister. The abrasive problem is further accentuated when attempting to round the edges, since such rounding only exposes more web surfaces and increases the amount of cutting or abrasion experienced by the surrounding insulating material.

It thus has been an object of the invention to provide a honeycomb structure having a rounded edge portion which does not detrimentally cut or abrade surrounding material.

SUMMARY OF THE INVENTION

In its simplest form, the present invention sets forth a honeycomb structure having smoothly rounded and low abrasion edge portions, and a method of forming the same. A conventionally extruded or pleated-type substrate is provided with a suitable batch material about the outer edge of each longitudinally opposed face, so as to partially fill the outermost two or three cells of the substrate which are adjacent the outer skin thereof. The batch material and substrate are then dried. After the material has been dried, the edges which have been filled with the batch material are then rounded to form a closed or continuous smoothly rounded, virtually non-abrasive corner surface.

DESCRIPTION OF THE PREFERRED EMBODIMENTS

Figure 1:
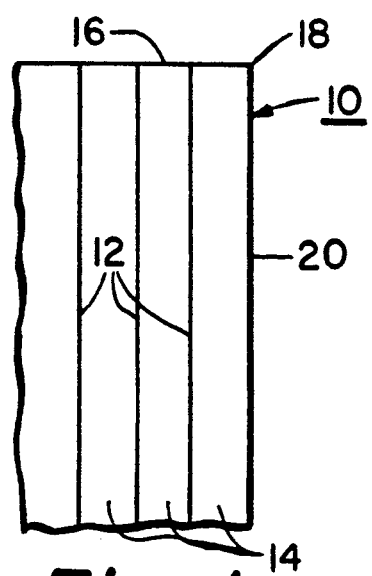
FIG. 1 is a schematic, fragmental view in elevation of a conventional honeycomb substrate.

Referring now to the drawings, FIG. 1 illustrates a conventional honeycomb structure 10 having a plurality of webs 12 extending longitudinally therethrough which form a plurality of longitudinally extending cells or flow channels 14, which terminate at each end in an opposed face 16. Each opposed face 16, only one of which is shown, terminates at a sharp corner 18 with a thickened outer skin or sidewall 20. The sharp corner edge 18 of the honeycomb structure 10 is extremely abrasive when the substrate is positioned within a supporting or insulating material and subjected to vibration, such as would be occasioned in automotive use. That is, the edge 18 has a tendency to cut into and detrimentally destroy the surrounding insulating and supporting material, thus rendering such material ineffective for its intended purpose.

Figure 2:
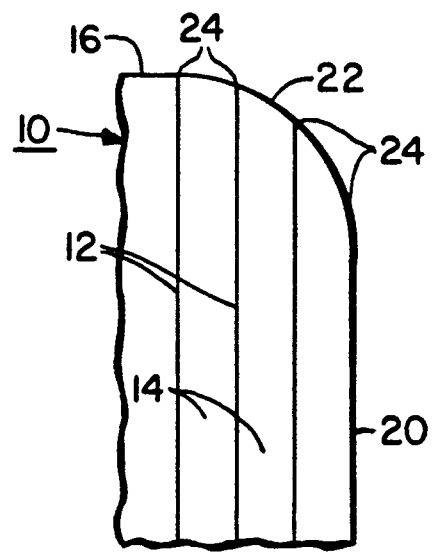
FIG. 2 is a schematic, fragmental view in elevation of a conventional honeycomb substrate having the edges rounded.

By merely rounding the corner 18 in the manner shown at 22 in FIG. 2, results in exposing a plurality of open abrasive edges 24 at the ends of the webs 12, thus producing even more abrasion and cutting action into the surrounding insulating and supporting material when the unit is subjected to standard vibration which would be encountered in vehicle usage.

Figure 3:
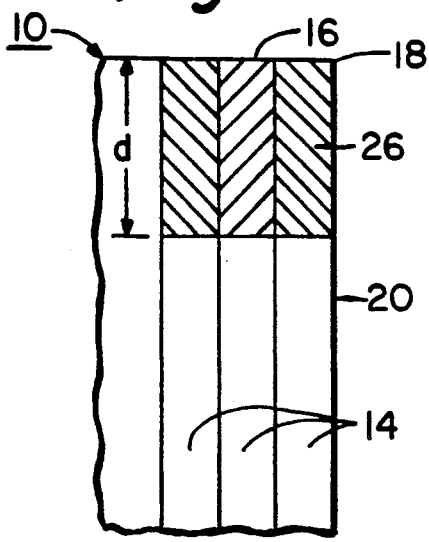
FIG. 3 is a schematic, fragmental view in elevation of a conventional honeycomb substrate showing the outer several cells filled with a suitable substance adjacent an end face of a substrate.

In order to overcome the abrasive problem of the open web portions, the outermost cells 14 of each opposed face 16, adjacent the sidewall 20 of a conventional honeycomb structure 10, are provided with a suitable material 26 and filled to a desired depth d, as shown in FIG. 3. The material 26 is preferably a wet batch material of the same composition as the material of the webs 12 forming the honeycomb structure 10, however any suitable material having compatible physical and chemical properties could be utilized.

The material 26 may be extruded about the peripheral edge 16 of the honeycomb structure 10 and pressed into the outermost peripheral cells 14, or it may be injected directly into such cells. It has been found that for substrates of the size normally utilized in vehicle emissions control, it is necessary to only fill the outer two or three cells of the substrate to a depth of about ⅛", however, it is understood that for larger substrates a greater depth and the plugging or filling of more peripheral cells may be required.

Figure 4:
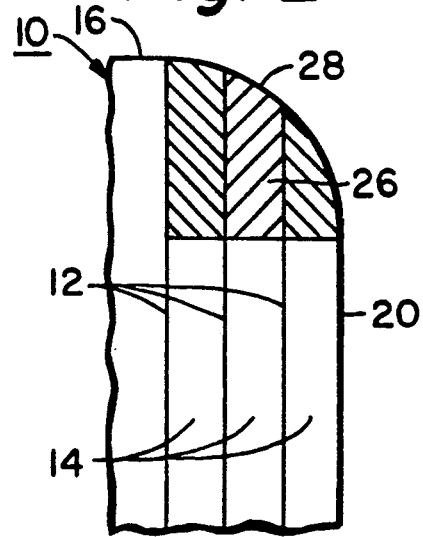
FIG. 4 is a schematic, fragmental view in elevation of a honeycomb substrate according to the present invention wherein the filled section of the substrate adjacent the edge and end face is rounded to form a smooth, virtually non-abrasive rounded surface.

As shown in FIGS. 3 and 4, the outermost three cells 14 adjacent sidewall 20 have been plugged to a depth d. Although the plugging or filling of the outermost cells 14 may be accomplished any time after the honeycomb substrate is formed, it is preferred to plug or fill the outer two or three cells 14 adjacent to the skin 20 while the substrate 10 is still in its green state. A wet batch material, preferably of the same composition as the honeycomb substrate, is supplied to the outermost cells 14 by either directly injecting the same therewithin, or by extruding a bead about the peripheral edge of each opposed face 16 and pressing the material into such cells to the desired depth d, of about ⅛". The substrate, with the plugged material in the peripheral cells of each opposed end is then preferably placed in an oven to dry same to a rigid firm consistency. After the drying process, the substrate may have the opposed ends 16 flattened to remove any uneven surface created by the plugging process.

As shown in FIG. 4, after the plugged substrate has been dried, the sharp edge 18 adjacent the opposed surfaces 16 and sidewall 20, is removed, such as by sanding or any other suitable machining process to provide a smoothly rounded, virtually non-abrasive radiused surface 28.

Figure 5:
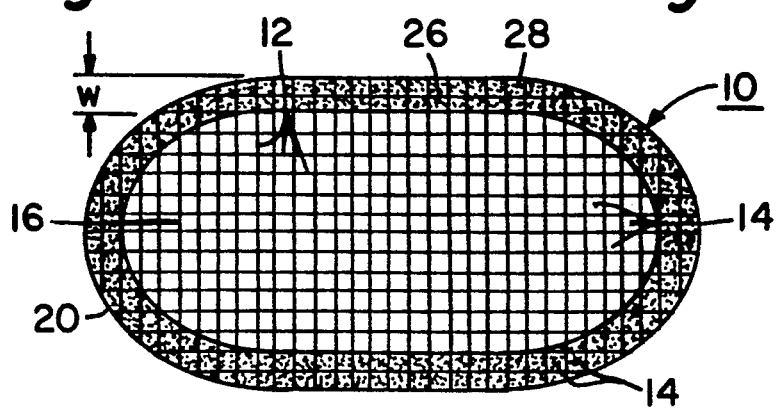
FIG. 5 is a schematic plan view of one opposed end face of a honeycomb substrate in accordance with the present invention, showing the outer peripheral cells filled with a suitable material and provided with a smoothly beveled or rounded edge.

As shown in FIG. 5, the smoothly rounded surface 28 only encompasses the two outer peripheral cells 14 where, for illustrative purposes, FIGS. 3 and 4 include three outermost cells 14. Further, as shown in FIG. 5, the plugging or filling material 26 extends inwardly from the outer peripheral sidewall 20, a distance of at least two cell widths w. In view of the fact that the surface 28 is a continuous smoothly rounded surface between the outer wall 20 and an opposed face 16, the surface has a very low abrasive coefficient and exhibits no cutting edges, such as those exposed in FIGS. 1 and 2. Accordingly, the smoothly rounded continuous solid surface 28 provides improved durability, not only to the substrate 10, but also to any surrounding supporting or insulating material utilized when encasing the substrate within a suitable container for vehicle emissions control. As previously mentioned, this is particularly important when the honeycomb substrate 10 is formed of extruded metal powders or wrapped metal foils, which must not only be physically supported within an automotive canister, but must also be electrically insulated therefrom when such substrate is used as a resistance heater for gases passing through the emissions control system. That is, it has been found that such metalized substrates are extremely abrasive and can detrimentally cut into and abrade supporting and insulating materials which are necessary for operative results.

As an alternative to plugging the outermost cells of the substrate, it would be possible to extrude a heavy or thick outer skin with the formation of an extruded honeycomb structure, or to wrap a heavy metal foil about a wrapped honeycomb structure, and round the resulting solid thickened skin adjacent each opposed face to provide a smoothly rounded, virtually non-abrasive solid surface similar to 28, and accomplish virtually the same result as that obtained by plugging the outermost cells. However, it will be appreciated that such an alternative would require substantially more material, and increase the weight and bulk of the substrate, since such thickened skin would extend through the substrate between the opposed faces 16.

Although the now preferred embodiments of the invention have been disclosed, it will be apparent to those skilled in the art that various changes and modifications may be made thereto without departing from the scope and spirit of the invention as set forth in the appended claims.

I claim:

1. A honeycomb structure comprising:
   a plurality of webs extending longitudinally through said honeycomb structure forming a plurality of longitudinally extending cells of desired width therebetween,
   said webs terminating at their opposite longitudinal ends in opposed faces,
   said honeycomb structure having an outer peripheral sidewall surrounding said webs and cells and extending between said opposed faces,
   an outer peripheral portion of said honeycomb structure being solid at least adjacent said opposed faces and inwardly from said outer peripheral sidewall a distance of at least two cell widths,
   an inner central portion of said honeycomb structure being open through said longitudinally extending cells, and
   the entire extent of said solid outer peripheral portion being rounded between said outer peripheral sidewall and each of said opposed faces to form a continuous solid smoothly rounded, relatively low abrasive surface between said sidewall and each of said opposed faces.

2. A honeycomb structure as defined in claim 1 wherein said honeycomb structure comprises an extruded honeycomb body, and said solid outer peripheral portion being formed of the same material as said extruded honeycomb body.

3. A honeycomb structure as described in claim 2 wherein said extruded honeycomb body and solid outer peripheral portion are formed of metal batch material.

4. A honeycomb structure as defined in claim 2 wherein said solid outer peripheral portion is in the form of a thickened outer skin and extends between said opposed faces.

5. A honeycomb structure as defined in claim 1 wherein said solid outer peripheral portion comprises a plugging material extending longitudinally inwardly to a desired depth from said opposed faces within those longitudinally extending cells adjacent said outer peripheral sidewall.

6. A honeycomb structure as defined in claim 5 wherein said plugging material is of a composition which is chemically compatible with and has the same physical characteristics as the honeycomb structure material.

7. A honeycomb structure as defined in claim 1 comprising a wrapped metal foil honeycomb body, and said solid outer peripheral portion being of the same material as said honeycomb body.

8. An extruded metal honeycomb structure comprising:
   a honeycomb body having a plurality of webs extending longitudinally therethrough forming a plurality of longitudinally extending cells therebetween and terminating at their opposite ends in a pair of opposed faces, said webs and cells being bounded by an outer peripheral wall extending between said opposed faces,
   plugging material filling opposite ends of those longitudinally extending cells adjacent said outer peripheral wall from said opposed faces to a desired depth,
   and said plugging material being provided with a smoothly curved surface between said outer peripheral wall and each of said opposed faces to provide a continuous solid substantially smooth and substantially abrasive-free rounded surface between said outer peripheral wall and each of said opposed faces.

9. An extruded metal honeycomb structure as defined in claim 8 wherein said plugging material is of the same composition as the composition of said extruded metal honeycomb structure.

10. An extruded metal honeycomb structure as defined in claim 8 wherein said plugging material fills the end portions of at least two rows of cells extending inwardly from said outer peripheral wall.

11. An extruded metal honeycomb structure as defined in claim 10 wherein said plugging material extends longitudinally inwardly from each opposed face to a depth sufficient to provide a solid rounded surface between said outer peripheral wall and each of said opposed faces.

12. A method of producing a honeycomb structure with low abrasive edge portions between end and wall portions thereof which comprises:

forming a honeycomb body having web portions extending longitudinally therethrough, defining longitudinally extending cells therebetween and terminating at their opposite ends in opposed faces, with an outer wall extending between said faces and bounding said webs and cells;

filling at least the outer two rows of cells which are adjacent and extend inwardly from said outer wall with a plugging material compatible with that of the honeycomb body to a desired depth from each of said opposed faces while leaving central cells, which are inwardly of said outer cells filled with plugging material, open and free of plugging material;

rigidifying said plugging material and said honeycomb body; and rounding said rigidified plugging material between said outer wall and each of said opposed faces to provide a solid continuous substantially low abrasive smoothly rounded surface between the entire periphery of said outer wall and each of said opposed faces.

13. A method of producing a honeycomb structure as defined in claim 12 including the step of forming the said honeycomb body by extruding metallic batch material into the form of a honeycomb structure.

14. A method of producing a honeycomb structure as defined in claim 12 including the step of wrapping metal foil into the shape of a honeycomb body.

15. A method of producing a honeycomb substrate as defined in claim 12 including the step of pressing said plugging material into at least the outer two rows of cells of said honeycomb body.

16. A method of producing a honeycomb structure as defined in claim 12 including the step of injecting said plugging material within at least said outer two rows of cells of said honeycomb body.

17. A method of producing a honeycomb structure as defined in claim 12 wherein said plugging material and said honeycomb body are heated to dry and rigidify the same.

18. A method of producing a honeycomb structure as defined in claim 12 including the step of sanding the rigidified plugging material to form a smooth continuous connecting surface between said outer wall and said opposed faces.

19. A method of producing a honeycomb structure as defined in claim 12 including the steps of extruding a metallic batch material to form said honeycomb body, filling said at least outer two rows of cells with a plugging material which is of the same composition as the metallic batch material from which the honeycomb body is formed, drying the honeycomb body and said plugging material so as to rigidify the plugged structure, and then sanding the edge of said honeycomb body adjacent the outer wall and each opposed face to form said smoothly rounded surface.

20. A method of producing a honeycomb structure defined in claim 19 including the step of plugging said at least two outer rows of cells with said plugging material while the honeycomb body is still in a green state to a depth sufficient to provide a continuous solid surface when the corner edge between the outer wall and the adjacent face is rounded.

* * * * *